United States Patent
McCarty et al.

(10) Patent No.: US 7,689,744 B1
(45) Date of Patent: Mar. 30, 2010

(54) METHODS AND STRUCTURE FOR A SAS/SATA CONVERTER

(75) Inventors: Christopher J. McCarty, Colorado Springs, CO (US); Margit C. Evensta, Colorado Springs, CO (US); Timothy E. Hoglund, Colorado Springs, CO (US)

(73) Assignee: LSI Corporation, Milpitas, CA (US)

( * ) Notice: Subject to any disclaimer, the term of this patent is extended or adjusted under 35 U.S.C. 154(b) by 438 days.

(21) Appl. No.: 11/082,673

(22) Filed: Mar. 17, 2005

(51) Int. Cl.
*G06F 13/38* (2006.01)
(52) U.S. Cl. .......................................... 710/74; 710/65
(58) Field of Classification Search .................... 710/74
See application file for complete search history.

(56) References Cited

U.S. PATENT DOCUMENTS

| | | | |
|---|---|---|---|
| 6,763,445 B1 * | 7/2004 | Klein et al. ................. | 711/173 |
| 2002/0066007 A1 * | 5/2002 | Wise et al. .................. | 712/300 |
| 2003/0135674 A1 * | 7/2003 | Mason et al. ................ | 710/74 |
| 2004/0078680 A1 * | 4/2004 | Hu et al. ..................... | 714/36 |
| 2004/0184470 A1 * | 9/2004 | Holden ....................... | 370/412 |
| 2005/0005044 A1 * | 1/2005 | Liu et al. ..................... | 710/74 |
| 2005/0108452 A1 * | 5/2005 | Loffink ....................... | 710/74 |
| 2006/0005061 A1 * | 1/2006 | Seto ............................. | 714/1 |
| 2006/0095630 A1 * | 5/2006 | Bashford et al. ........... | 710/305 |
| 2006/0106997 A1 * | 5/2006 | Elliott et al. ................ | 711/150 |
| 2006/0114912 A1 * | 6/2006 | Kwan et al. ................. | 370/395.4 |
| 2006/0136619 A1 * | 6/2006 | Edirisooriya et al. ...... | 710/52 |

OTHER PUBLICATIONS

George Penokie, "End-to-End Data Protection", Oct. 22, 2003, T10 Committee (http://www.t10.org), Revision 9.*
SS-1100AA SATA Active/Active Mux Product Brief; SilconStor, Inc.; Apr. 2004.

* cited by examiner

*Primary Examiner*—Henry W. H. Tsai
*Assistant Examiner*—John B Roche
(74) *Attorney, Agent, or Firm*—Duft Bornsen & Fishman LLP

(57) ABSTRACT

Methods and structure for enabling transparent coordination between multiple host systems sharing access to a common SATA storage device to improve bandwidth utilization therebetween in a manner transparent to each of the multiple host systems. The SAS protocol may be utilized by each of the host systems coupled to an SAS/SATA Converter. The storage device coupled to an output path of the SAS/SATA Converter is selectively coupled to one of the multiple host systems each coupled to an input signal path of the SAS/SATA Converter to the shared SATA storage device. Protocol conversion within the SAS/SATA Converter may convert between host SAS protocol exchanges and SATA protocol exchanges of the storage device. Other features within the SAS/SATA Converter may provide queuing or buffering of SAS protocol exchanges from a host system presently non-selected for coupling to the shared SATA storage device.

12 Claims, 2 Drawing Sheets

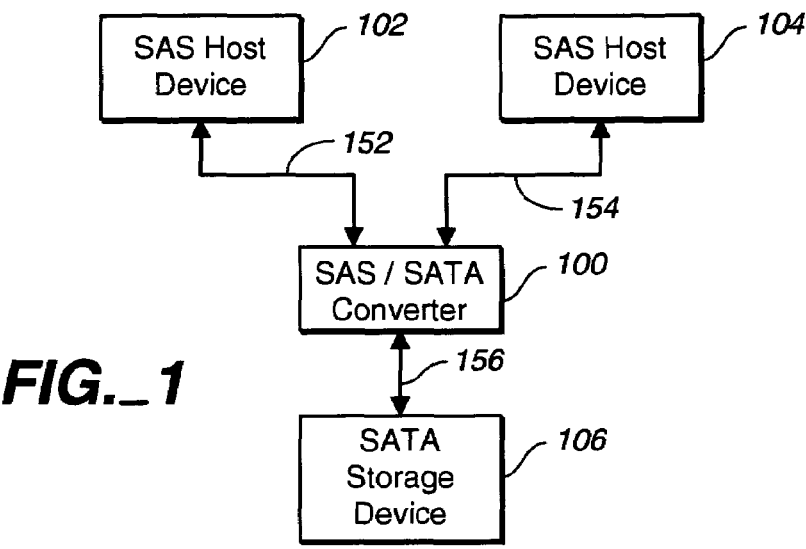
FIG._1
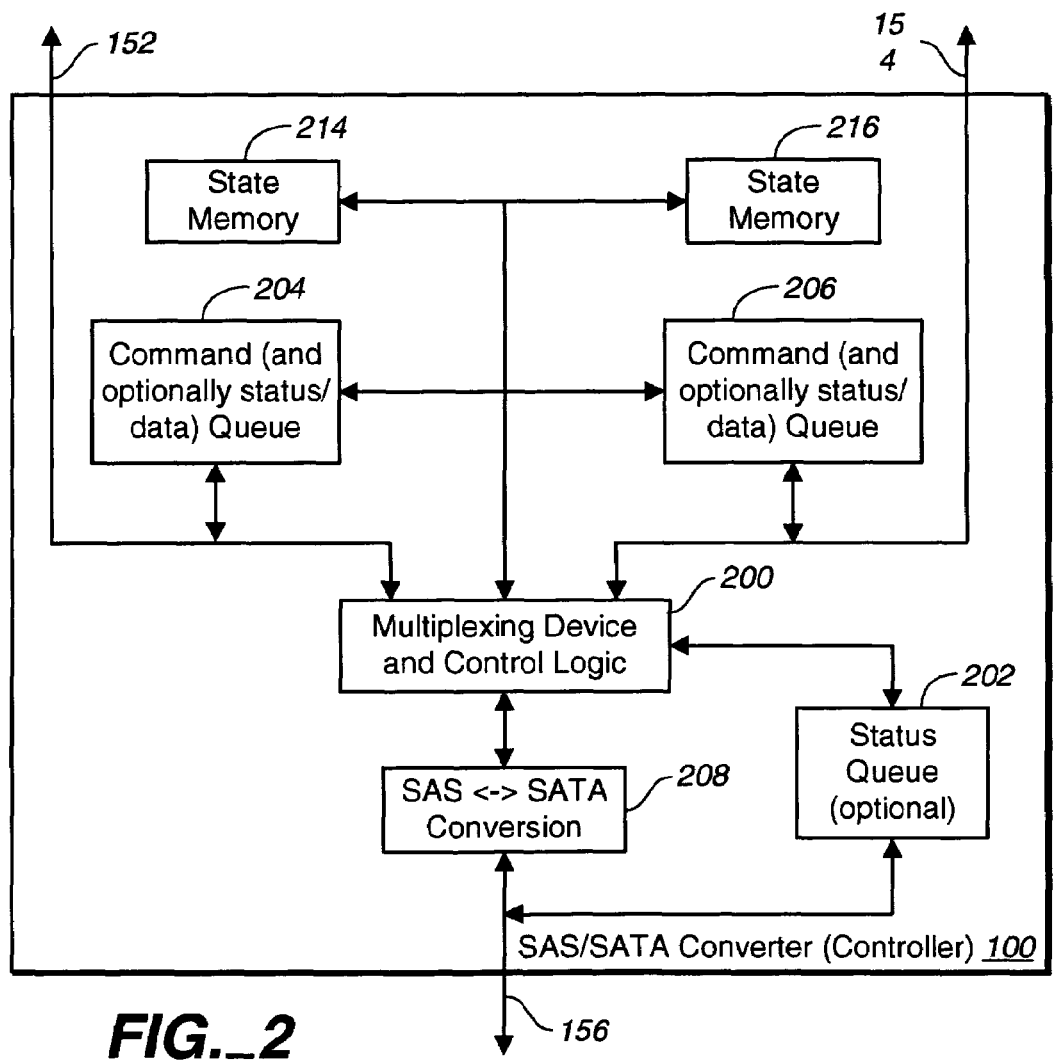
FIG._2

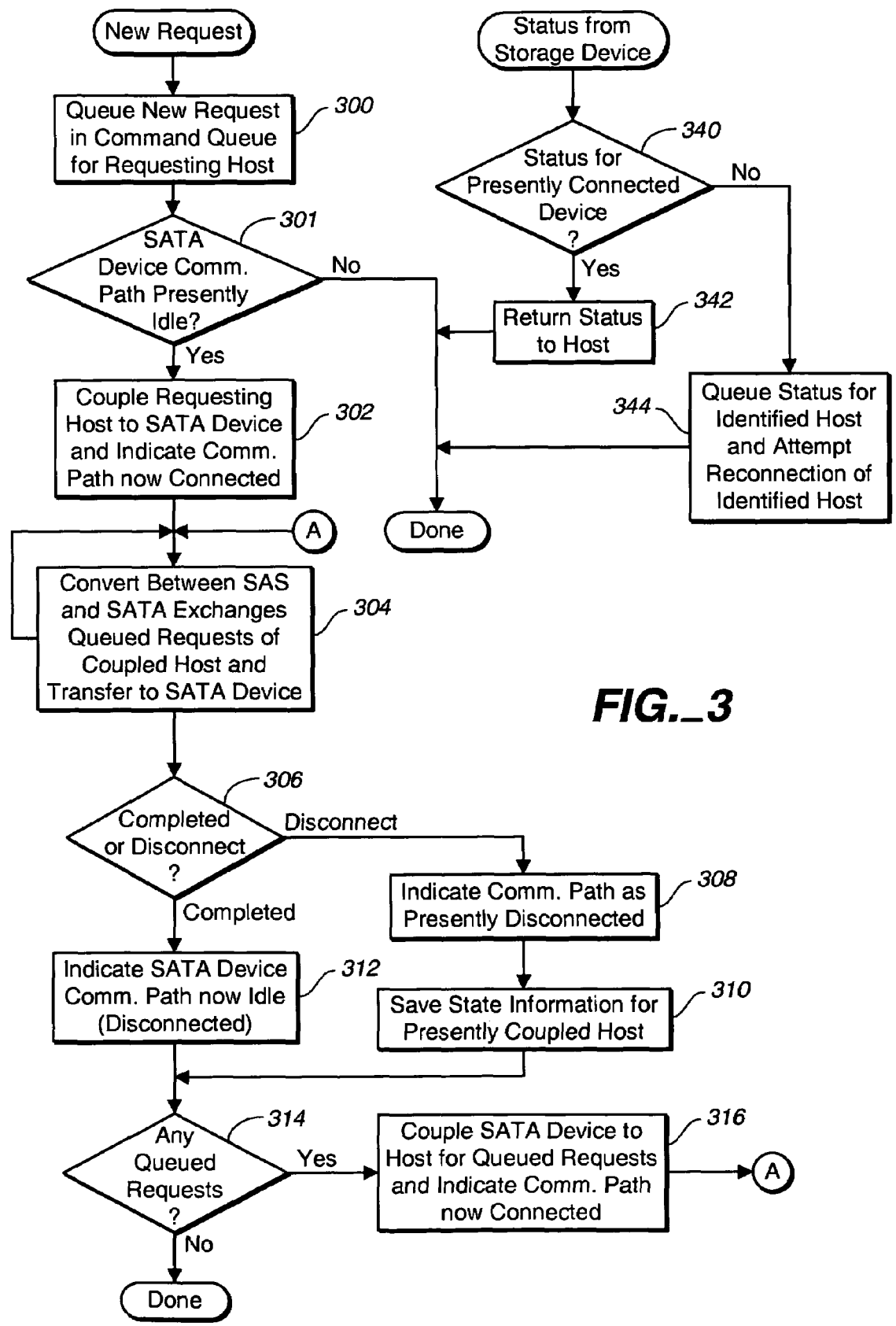
FIG._3

METHODS AND STRUCTURE FOR A SAS/SATA CONVERTER

BACKGROUND OF THE INVENTION

1. Field of the Invention

The invention relates generally to storage devices and systems using storage devices and, more specifically, relates to methods and structures for coordinating shared access to a SATA storage device by multiple host systems.

2. Discussion of Related Art

SCSI (small computer systems interface) and AT attachment (ATA—e.g., IDE and EIDE) are both popular protocols for coupling storage devices to host systems. Exemplary storage devices may include individual magnetic and optical disk drives, RAID or other logical storage volumes, tape drives, tape autochangers, tape libraries, etc. Host systems may be any device designed to couple to such a storage device including, for example, a personal computer, workstation, or server computing system, a storage host bus adapter within such a computing system, an embedded storage subsystem controller housed within a storage subsystem, etc.

Both the SCSI and ATA standards originated as parallel bus structures and associated command and status protocols. Over time, high speed serial communication media and protocols evolved to compete with the performance of even high speed parallel bus structures but at lower cost. Both SCSI and ATA command and status features have since been adapted for incorporation with such high speed serial communication media and protocols. For example, serial attached SCSI (SAS) protocols allow for exchange of SCSI command and status blocks over high speed serial communication media. In addition, a serial ATA (SATA) version of the ATA command and status protocol has been adapted for utilization over such SAS communication media and protocols. Such protocols are well known to those of ordinary skill in the art and specifications may be obtained at, for example, www.t10.org and www.serialata.org.

Utilizing SAS communication media and protocols to communicate between a host system and a storage device allows for multiple host systems to easily coordinate and share access to a common, shared storage device. The SCSI protocols inherently allow a host device (i.e., an initiator) to be temporarily disconnected from the storage device (i.e., a target) when the storage device is not prepared to complete a presently outstanding request. Following such a disconnection, another host system may utilize the SCSI communication medium to perform other operations on the same shared storage device or other storage devices on the same communication medium. By contrast, SATA protocols inherently prohibit such simple coordination and the sharing of a storage device. Rather, when a first host system initiates an exchange with a shared SATA storage device, that host system has effectively locked the communication path to that storage device until the desired exchange of information is completed. No other host system may utilize the communication bandwidth to the SATA storage device until the first host system has completed its requested exchange and relinquished its temporary exclusive control of communications with the shared SATA storage device.

SATA protocols include specifications of a device referred to as a "port selector". See, e.g., http://www.serialata.org/docs/ps_100_Gold.pdf. A port selector is a device that simply multiplexes multiple host systems utilizing SATA protocols for selective coupling to an SATA storage device. SATA protocol exchanges inherently, in essence, require locking of access to the storage device until a complete sequence of command and data exchanges are completed. A port selector is therefore a simple multiplexer that fails to improve upon utilization of available bandwidth. Further, the selection feature of such a port selector is under control of one or more of the host systems coupled thereto. The host systems must therefore take responsibility for managing the port selection features of the SATA port selector. Thus, coordinating shared access to the SATA storage device is not transparent with respect to all of the host systems.

Some prior techniques allow multiple active SATA hosts to share access to a common SATA storage device. Multiple active hosts may allow for redundant controllers/hosts to access a common shared SATA storage device to thereby permit rapid switchover between redundant storage controllers to access a common SATA storage device. However, as noted above, such prior solutions provide no means or structure to allow for improved utilization of available bandwidth by coordinating use of otherwise idle time in the shared access to the SATA storage device.

It is evident from the above discussion that a need exists for an improved method, circuit, system and structure to permit better utilization of available bandwidth in sharing access to a common SATA storage device while doing so in a manner transparent to all attached host systems.

SUMMARY OF THE INVENTION

The present invention solves the above and other problems, thereby advancing the state of the useful arts, by providing methods and structure for simplifying shared access by multiple host systems to a common SATA storage device. Features and aspects hereof include a SAS/SATA Converter that multiplexes multiple SAS protocol connections from multiple host systems for selective coupling to a shared SATA protocol compliant storage device. The SAS/SATA Converter may include protocol conversion capabilities to convert between SAS protocol exchanges relied upon by the host systems and SATA protocol exchanges relied upon by the storage device. In coupling to the multiple host systems, the SAS protocols inherently permit disconnection of a present coupling between a first host system with the storage device to permit a second host system to be coupled to the storage device. Later re-connection initiated by the storage device may cause re-connection to the original first host computer to allow completion of its SAS protocol exchange sequence. While one of the multiple host systems is presently non-selected by the multiplexing features and aspects hereof for coupling to the storage device, queuing features permit buffering or queuing of exchanges between the SATA storage device and the presently not non-selected host system. Later re-connection to the presently non-selected host system allows the buffered or queued exchanges to be completed. The multiplexing and queuing features and aspects hereof permit multiple host systems to be multiplexed and thereby coordinate access to a shared SATA device in a manner transparent to each of the multiple host systems.

A feature hereof provides for a circuit for coupling to a SATA storage device, the circuit comprising: a first signal path adapted for coupling to a first host system for SAS protocol exchanges; a second signal path adapted for coupling to a second host system for SAS protocol exchanges; a third signal path adapted for coupling to a storage device for SATA protocol exchanges; and a controller coupled to the first signal path and coupled to the second signal path and coupled to the third signal path and adapted to convert between the SAS protocol exchanges and corresponding SATA protocol exchanges and adapted to queue SAS protocol exchanges from either of the first host system and the second host system.

Another aspect hereof further provides that the controller further comprises: a multiplexer for selectively establishing a communication path between the third signal path and a selected path of either the first signal path or the second signal path; and a protocol converter for converting between SAS protocol exchanges and SATA protocol exchanges.

Another aspect hereof further provides that the controller further comprises: a queue for queuing information to be exchanged between the storage device and a non-selected host system of the first host system and the second host system where the non-selected host system is not coupled to the present selected path.

Another aspect hereof further provides that the queue further comprises: a command queue for queuing SAS protocol commands received from the non-selected host system; and a status queue for queuing SATA protocol information received from the SATA storage device for return to the non-selected host system.

Another aspect hereof further provides that the controller is adapted to enable the first host system and the second host system to interact with the SATA storage transparently with respect to one another.

Another aspect hereof further provides that the controller further comprises: a first state memory associated with the first signal path for storing state information regarding exchanges between the first host system and the storage device; and a second state memory associated with the second signal path for storing state information regarding exchanges between the second host system and the storage device, wherein the controller is adapted to utilize the first state memory and the second state memory to permit the transparent interaction between the storage device and either of the first host system and the second host system.

Another aspect hereof further provides that the third data signal path operates at a different data transfer rate than the data transfer rate of either or both of the first signal path and the second signal path and wherein the controller utilizes a queue to permit speed matching of the data rates used by the first, second, and third signal paths.

Another aspect hereof further provides that the controller further comprises: end to end data protection protocol emulation to provide SCSI compliant EEDP command processing and adapted to store EEDP protection information on the SATA storage device coupled to the third signal path.

Another feature hereof provides a system comprising: a first host system adapted for performing SAS protocol exchanges; a second host system adapted for performing SAS protocol exchanges; a storage device adapted for performing SATA protocol exchanges; a multiplexing device coupled to the first host system and coupled to the second host system and coupled to the storage device and adapted to convert between SAS protocol exchanges and SATA protocol exchanges and adapted to coordinate independent interaction between the storage device and either of the first host system and the second host system transparently with respect to the first host system and with respect to the second host system.

Another aspect hereof further provides that the multiplexing device further comprises: a multiplexer for selectively coupling a selected host of the first host system and the second host system to the storage device to enable exchanges between the selected host and the storage device; and a queue for queuing exchanges associated with a non-selected host of the first host system and the second host system while the selected host is selectively coupled to the storage device.

Another aspect hereof further provides that the storage device communicates with the multiplexing device at a data rate different than the data rate of either or both of the first and second host systems.

Another aspect hereof further provides that the multiplexing device is further adapted to use the queue for speed matching in exchanges between the storage device and either or both of the first and second host systems.

Another aspect hereof further provides that the multiplexing device is further adapted to emulate SCSI EEDP protocols.

Another aspect hereof further provides that the multiplexing device is further adapted to store and retrieve EEDP data protection information on the storage device.

Another aspect hereof further provides that the multiplexing device is further adapted to format blocks on the storage device to include space for storage of the EEDP data protection information.

Another feature hereof provides a method for coordinating operation of multiple host systems exchanging information with a shared SATA storage device, the method comprising: coupling the first host system to the storage device to enable exchanges between the first host system and the storage device; queuing exchanges associated with a second host system while the first host system is coupled to the storage device; decoupling the first host system from the storage device; and coupling the second host system to the storage device to enable exchange of queued exchanges between the second host system and the storage device.

Another aspect hereof further provides that the steps of coupling and decoupling each further comprise: controlling a multiplexer device to selectively couple and decouple the first host system or the second host system with the storage device.

Another aspect hereof further provides that the method further comprises converting between SAS protocols used in exchanges with the multiple host systems and SATA protocols used in the storage device exchanges.

Another aspect hereof further provides that the step of converting further comprises: emulating SCSI EEDP protocol by storing and retrieving data protection information on the storage device.

Another aspect hereof further provides that the step of queuing further comprises: entering exchanged information into a queue associated with the second host system when the first host system is presently coupled to the storage device.

Another aspect hereof further provides that the step of queuing further comprises: matching the speed of the communication path between the storage device and the multiplexer device with the speed of the communication path between either or both of the first or second host system and the multiplexer device by using the queue to queue exchanges between the storage device and either or both of the first and second host systems.

BRIEF DESCRIPTION OF THE DRAWINGS

FIG. 1 is a block diagram of an exemplary system in accordance with features and aspects hereof multiple host systems coupled to a shared SATA storage device.

FIG. 2 is a block diagram of exemplary functional elements of an SAS/SATA Converter providing features and aspects hereof to couple multiple SAS protocol compliant host devices to a shared SATA storage device.

FIG. 3 is a flowchart describing exemplary methods operable in an SAS/SATA Converter or system as in FIGS. 1 and 2.

DETAILED DESCRIPTION OF THE DRAWINGS

FIG. 1 is a block diagram of a system in accordance with features and aspects hereof wherein multiple host devices 102 and 104 may be coupled to a shared SATA storage device 106 via SAS/SATA Converter 100. As noted above, each host device 102 and 104 is preferably operable to communicate via SAS communication media using SAS protocols. Such a host device 102 and 104 may be, for example, a host computing system such as a personal computer, workstation, or server; a host bus adapter within such a host system; or a storage controller embedded within a storage subsystem operable to control the storage subsystem's storage devices and to interface and interact with attached host systems. Host device as used herein, therefore represents any such host device or host computing system adapted for generating SAS protocol exchanges. Each such host device 102 and 104 may be coupled to an input signal path of SAS/SATA Converter 100.

SAS/SATA Converter 100, described in further detail herein below, generally provides multiplexing features to selectively couple a selected one of the host devices 102 and 104 (via paths 152 and 154, respectively) to the shared SATA storage device 106 (via path 156). In addition, SAS/SATA Converter 100 may include protocol converter features to convert between SAS protocol exchanges compatible with the host devices 102 through 104 and SATA protocol exchanges appropriate for SATA storage device 106. Further, SAS/SATA Converter 100 may include features to allow buffering or queuing of commands generated by a host device 102 through 104 destined for the SATA storage device 102. Further, status or other information directed from the SATA storage device 106 back to one of the multiple host devices 102 through 104 may be buffered or queued within SAS/SATA Converter 100. As discussed further herein below, features and aspects hereof allow SCSI protocol disconnect features to be utilized in coupling multiple host devices to a shared SATA storage device 106. Prior techniques including, for example, an SATA port selector, acted as passive multiplexing devices that remained coupled between a particular host and the storage device until the host relinquished its control. By contrast, SAS/SATA Converter 100 of FIG. 1 is adapted to permit multiple host systems to more effectively share access to a common SATA storage device. Where a particular exchange is temporarily paused or waiting for the target device, standard SCSI protocol disconnect sequences applicable to the SAS protocol may be utilized to allow other host devices to share access to the common SATA a storage device. Details of exemplary embodiments and methods of operating such an SAS/SATA Converter 100 are provided further herein below.

Those of ordinary skill in the art will readily recognize that SAS/SATA Converter 100 may be easily configured for coupling to any number of host devices. In addition, those of ordinary skill in the art will readily recognize that SAS/SATA Converter 100 may be configured as a stand alone circuit or system coupled through external cabling between multiple host devices 102 through 104 and the shared SATA storage device 106. Alternatively, SAS/SATA Converter 100 may be integrated with the electronics and system circuits that comprise host devices 102 through 104 or may be integral within circuits and logic associated with SATA storage device 106.

FIG. 2 is a block diagram providing additional details of an exemplary embodiment of SAS/SATA Converter 100 (also referred to herein as a controller) as shown above and FIG. 1. SAS/SATA Converter 100 may include multiplexing and control logic 200 to controllably couple a storage device on its signal path 156 to a selected one of multiple host systems associated with its signal paths 152 through 154. As noted above, those of ordinary skill in the art will recognize that any number of signal paths and associated host devices may be coupled to such multiplexing and control logic 200.

A presently selected host device coupled to signal path 152 or 154 is controllably coupled through multiplexing and control logic 200 to SAS to SATA conversion element 208 to convert any SAS protocol exchanges into corresponding SATA protocol exchanges. The SATA protocol exchanges generated by conversion element 208 may then be applied to a SATA storage device coupled to signal path 156. Such conversion between SAS exchanges and SATA exchanges will be apparent to those of ordinary skill in the art and are described, for example, in published specifications available at www.t10.org.

Associated with multiplexing and control logic 200 are a number of queues or buffers and state memory. Each signal path 152 and 154 is associated with a corresponding state memory 214 and 216, respectively, and a corresponding command queue 204 and 206, respectively. Signal path 156 is associated with a status queue or buffer 202. As SAS commands are received from a SAS compliant host device on path 152 or 154, the commands are either passed through multiplexing and control logic 200 if that host is presently selected or the commands may be queued in command queue 204 or 206, respectively, if that host device is presently disconnected or decoupled from the shared storage device couple to path 156. Command queues 204 and 206 therefore represent queues or buffers for storing SAS protocol exchanges for a host device presently disconnected or decoupled from the SATA storage device.

In accordance with SAS protocol exchanges, a host device (initiator) may be disconnected from the storage device (target) at various times. In standard SCSI protocols, the disconnection is typically performed by the target device when it is aware that an operation cannot be immediately processed. By contrast, SATA protocols do not provide for such disconnection performed by the SATA storage device. Rather, the SATA storage device operations may be modeled as a state machine that must operate to a point of completion. In accordance with features and aspects hereof, the SAS/SATA Converter 100 may determine that the presently connected host device may be disconnected based on the present state of the SATA storage device. Thus, the SAS/SATA Converter 100 emulates the disconnection features of a standard SCSI storage device though the storage device is actually an SATA storage device. Since the conversion to SATA protocol exchanges involves emulating the state machine model of the SATA storage device, a determination to disconnect may require saving state information regarding the present conditions of the SAS protocol exchange and the corresponding SATA protocol exchange. A state memory 214 and 216 may be associated with each signal path 152 and 154. In like manner, if a SATA storage device coupled to signal past 156 returns status or data destined for a host device on either signal path 152 or 154 that is presently disconnected, such a status or other information returned message may be retained in status queue or buffer 202 until such time as the identified host device is reconnected to the storage device.

Those of ordinary skill in the art will recognize that status queue 202 and command queues 204 and 206 may be implemented using any suitable memory components including, for example, DRAM, SDRAM and other volatile memories as well as Flash or various other forms of nonvolatile memory depending on well-known performance, capacity and cost design considerations. In like manner, state memory 214 and 216 may be implemented utilizing any well-known memory component.

Multiplexing and control logic 200 may be implemented utilizing any of several well-known multiplexing devices and/or standard, combinatorial logic. Exemplary control processes operable within multiplexing and control logic 200 are discussed further herein below with respect to FIG. 3. Such control techniques may be implemented utilizing any standard commercially available combinatorial logic gates and cells or in suitably programmed instructions in a programmable processor. SAS to SATA conversion element 208 may be implemented utilizing custom combinatorial logic circuits as well as programmable logic devices and processors. Such design choices will be readily apparent to those of ordinary skill in the art.

FIG. 3 is a flowchart describing processing within an SAS/SATA Converter in accordance with features and aspects hereof. In general, FIG. 3 represents methods operable within an SAS/SATA Converter in accordance with features and aspects hereof to process a newly received I/O request from an attached host device. The SAS/SATA Converter is also adapted to forward the converted request to the shared SATA storage device and to return status and other information to the requesting host device (also converted between SATA protocols and SAS protocols). Element 300 is first operable in response to receipt of a new request to queue or buffer the received SAS request in a command queue associated with the requesting host device. As noted above, paths within the SAS/SATA Converter may be associated with a corresponding host device and may include a buffer or queue for queuing commands associated with that corresponding host device. The received command so buffered or queued in the command queue will be processed at a later time when the communication path is again available for use (e.g., when a current request is completed or is disconnected in accordance with SCSI protocols).

Element 301 next determines whether the communication path through the SAS/SATA Converter is presently in use or idle and hence available for use in processing a newly received request. Any suitable indicia may be tested to determine the present state of the communication path. For example, a simple state variable or register may be used to store and test the present state of connectivity of the communication path between one of multiple host devices and the shared SATA storage device.

If the communication path is presently unavailable, processing of the received request is completed until the communication path is again idle and may be coupled to this presently requesting host system. Appropriate status information may be generated and returned to the requesting SAS host device to indicate that the SATA storage device has not yet completed the processing of the request.

If element 301 determines that the communication path through the SAS/SATA Converter is presently available or idle (e.g., disconnected from all other host devices), element 302 is operable to controllably select the requesting host device for coupling to the shared SATA storage device. In addition, element 302 is operable to set the indicia tested by element 301 to indicate that the communication path is now connected or coupled with the requesting host device. Element 304 is then operable to process the SAS protocol exchanges provided by the requesting host device. Processing may include converting the SAS protocol exchanges into corresponding SATA protocol exchanges to be forwarded to the SATA storage device.

Element 304 is operable to continue processing SAS protocol exchanges and forwarding the converted exchanges to the SATA storage device until such time as either, the request is complete or, the target device cannot rapidly respond to a provided protocol exchange. In the latter case, as is known in the SCSI protocols, a disconnect sequence may be returned to the requesting host device so that the communication path may be used by other host devices in communicating with the shared SATA storage device. If element 304 stopped processing due to a condition for which a SCSI disconnect may be sent, element 304 send the appropriate disconnect response to the SAS host device. Element 306 therefore determines whether the processing of element 304 completed all SAS protocol exchanges or whether the process ended with a SCSI disconnect to permit other host devices to use the communication path. If element 306 determines that the processing of element 304 completed the requested SAS protocol exchanges, element 312 is operable to indicate that the communication path is now idle or disconnected from the current requesting host device. Processing then continues with element 314 as discussed further herein below.

If element 306 determines that the processing of element 304 resulted in a disconnect sequence returned to the host device, element 308 is operable to indicate that the communication path is presently disconnected from the current requesting host device. Element 310 then saves state information associated with the communications between the requesting host device (now disconnected) and the SATA storage device. The saved state information may be used later (as discussed further herein below) to resume the communications between the currently requesting host device (presently disconnected) and the SATA storage device. Processing continues with element 314 as discussed further herein below.

Those of ordinary skill in the art will recognize a variety of circumstances and conditions in which SCSI protocols associated with the requested SAS protocol exchanges may suggest the propriety of a disconnect sequence. For example, a requesting host may be disconnected while a time consuming "seek" operation proceeds. During the disconnected time, other seek requests may be directed to the shared SATA storage device by other host devices. Optimizations within the shared SATA storage device may reorder the plurality of seek requests so that another host request may be satisfied before the presently requesting host device request. Thus, by allowing other host devices to exchange information with the SATA storage device, overall performance of the system incorporating multiple host devices and a shared SATA storage device may be improved.

Element 314 is operable following completion or disconnect of the SAS protocol exchanges by elements 304 through 312. Element 314 is operable to determine whether any requests from other host devices have been queued during the time that elements of 304 through 312 have been processing SAS protocol exchanges from the currently requesting host device. If no other host devices have queued requests during this period of time, processing is completed to await a request from another host device or a reconnect sequence initiated by status received from the shared SATA storage device. If element 314 determines that some host device coupled to the SAS/SATA Converter has queued requests or if there is queued status for return to another host device, element 316 is operable to control the SAS/SATA Converter to select another host device for coupling to the SATA storage device. The host device to be selected is one that has queued SAS protocol exchanges in its associated command queue for forwarding to the shared SATA storage device. Element 316 also sets the indicia within the SAS/SATA Converter to indicate that the communication path is now connected to the newly selected host device for which the command queue is to be processed. Processing then continues by looping back at label "A" to element 304 to process the queued SAS protocol exchanges. As noted above, element 304 is operable to process queued SAS protocol exchanges by converting them to corresponding SATA protocol exchanges and forwarding the converted command sequences to the shared SATA storage device.

Those of ordinary skill in the art will recognize that the queued commands may be processed to completion or may be interrupted (i.e., disconnected) to be completed later (i.e., reconnected) in accordance with SAS protocols. Thus a sequence of commands queued following a disconnect from the corresponding SAS host may be transmitted in essentially the same manner as commands forwarded from the SAS host while connected to the SATA device.

Status or other information may also be returned from the shared SATA storage device. When such status or other information is returned from the SATA storage device, the SAS/SATA Converter will receive the information and forward the information to the appropriate host device. If the appropriate host device is not presently connected through the SAS/SATA Converter to the shared SATA storage device, the status or other information may be queued for later returned to the appropriate host device when the device eventually reconnects. Element 340 is therefore operable in response to receipt of status or other information from the shared SATA storage device. Element 340 determines whether the returned information is intended for the presently connected host device. If so, element 342 is operable to return the status or other information to the presently connected host device. If not, element 344 queues the returned information in a status queue associated with the SATA storage device (e.g., status queue 202 associated with the SATA device in FIG. 2). The queued information may eventually be returned to the identified host device when the host device is eventually reconnected with the shared SATA storage device. Optionally as a matter of design choice, returned data and status from the SATA device may be queued in the queue associated with each host device (i.e., queues 204 and 206 associated with corresponding SAS hosts in FIG. 2).

Further, element 344 may initiate a reconnection request for the associated SAS host device. In accordance with SAS/SCSI protocols, a reconnection request is directed from a target device back to the original initiator device (i.e., SAS host device) to indicate that the target device is again ready for ongoing exchanges.

Those of ordinary skill in the art will readily recognize that the methods of FIG. 3 may be implemented as application specific combinatorial logic circuits as well as programmed instructions in an appropriate general or special purpose processing device. Such design choices are well known to those of ordinary skill in the art.

Another benefit hereof is derived from the buffer features and aspects of the SAS multiplexer. The buffering aspects hereof permit each link (i.e., each SAS link to a host device and the SATA link to a SATA storage device) to operate at a preferred data rate regardless of the transfer speed of other links. In other words, the use of a buffer in the SAS/SATA Converter in accordance with features and aspects hereof enables speed matching of the various links. Thus, alignment of SATA primitives is simplified in that each SAS link is buffered such that SATA primitives exchanged over the SATA link through the conversion element may be properly aligned at the data rate of the SATA link regardless of the speed of the various SAS links with which the information is to be exchanged.

Another aspect hereof enables implementation of SCSI protocol "end to end data protection" features ("EEDP"). EEDP is a feature of the SCSI standards that enhances the SCSI command and status exchanges to include data protection information added to every formatted block of stored data exchanged between the target device (i.e., storage device) and the initiator device (i.e., host device/controller). Various SCSI commands (i.e., command descriptor blocks or CDBs) are enhanced to utilize and/or transfer the data protection information between the target and initiator. The EEDP features are specified in the SCSI specifications and are generally available through www.t10.org.

SATA standards do not inherently support such features since the SATA storage devices are not SCSI compliant devices. In accordance with features and aspects hereof, control and conversion logic operable in accordance with features and aspects hereof may emulate the EEDP features in the process of converting between SAS exchanges used by the host device and SATA exchanges used by the storage device. For example, control logic 200 and/or conversion element 208 of FIG. 2 may incorporate features to implement EEDP compatible features on the attached SATA storage device.

For example, many present-day SATA disk drives permit formatting of disk drive sectors at virtually any arbitrary sector/block size. Features and aspects hereof associated with conversion between SAS and SATA exchanges therefore format the SATA storage device sectors/blocks to a size requested by an attached host device plus N data protection bytes wherein N is the number of data protection information bytes defined by the EEDP specifications. For example, EEDP data protection information consists of 8 bytes (2-bytes logical block guard (CRC), 2-bytes logical block application tag, and 4-bytes logical block reference tag). This 8-byte data protection information field is then appended to each sector/block of the formatted disk drive such that the sector/block size is enlarged by 8 bytes (e.g., 520 bytes per sector rather than 512 as is typical). Control and conversion logic of the SAS/SATA Converter then manages that data protection information so as to emulate the EEDP features of a SCSI storage device while the SATA storage device is unaware of the feature. Structures and methods to manage such EEDP data in accordance with SCSI EEDP protocols will be readily recognized by those of ordinary skill in the art. Modifications to such well known structures and methods to store and retrieve the data protection information on the properly enlarged sectors/blocks of a SATA storage device in accordance with features and aspects hereof will be readily apparent to those of ordinary skill in the art.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. In particular, those of ordinary skill in the art will readily recognize that features and aspects hereof may be implemented equivalently in electronic circuits or as suitably programmed instructions of a general or special purpose processor. Such equivalency of circuit and programming designs is well known to those skilled in the art as a matter of design choice. As a result, the invention is not limited to the specific examples and illustrations discussed above, but only by the following claims and their equivalents.

What is claimed is:

1. A circuit for coupling to a SATA storage device, the circuit comprising:
   a first signal path adapted for coupling to a first host system for SAS protocol exchanges;
   a second signal path adapted for coupling to a second host system for SAS protocol exchanges;
   a third signal path adapted for coupling to a storage device for SATA protocol exchanges; and
   a controller coupled to the first signal path and coupled to the second signal path and coupled to the third signal path, said controller comprising:
      a multiplexer for selectively establishing a communication between the third signal path and a selected path of either the first signal path or the second signal path;
      a protocol converter for converting between the SAS protocol exchanges and corresponding SATA protocol exchanges; and
      a queue for queuing SAS protocol exchanges from and SATA protocol exchanges to the non-selected host system of the first host system and the second host system where the non-selected host system is not coupled to the present selected path, wherein the queue comprises a command queue for queuing SAS protocol commands received from the non-selected host system and a status queue for queuing SATA protocol information received from the SATA storage device for return to the non-selected host system, wherein:
   the controller is adapted to enable the first host system and the second host system to interact with the SATA storage transparently with respect to one another, the controller further comprising:
      a first state memory associated with the first signal path for storing state information based on exchanges between the first host system and the storage device during operation; and
      a second state memory associated with the second signal path for storing state information based on exchanges between the second host system and the storage device during operation,
      wherein the controller is adapted to utilize the first state memory and the second state memory for the transparent interaction between the storage device and either of the first host system and the second host system.

2. The circuit of claim 1 wherein the third data signal path operates at a different data transfer rate than the data transfer rate of either or both of the first signal path and the second signal path and wherein the controller utilizes a queue for speed matching of the data rates used by the first, second, and third signal paths.

3. The circuit of claim 1 wherein the controller further comprises:
   end to end data protection protocol emulation to provide SCSI compliant EEDP command processing and adapted to store EEDP protection information on the SATA storage device coupled to the third signal path.

4. A system comprising:
   a first host system adapted for performing SAS protocol exchanges;
   a second host system adapted for performing SAS protocol exchanges;
   a storage device adapted for performing SATA protocol exchanges;
   a multiplexing device coupled to the first host system and coupled to the second host system and coupled to the storage device and adapted to convert between SAS protocol exchanges and SATA protocol exchanges and adapted to coordinate independent interaction between the storage device and either of the first host system and the second host system transparently with respect to the first host system and with respect to the second host system, wherein:
   the multiplexing device is further adapted to emulate SCSI EEDP protocols and to store and retrieve EEDP data protection information on the storage device.

5. The system of claim 4 wherein the multiplexing device further comprises:
   a multiplexer for selectively coupling a selected host of the first host system and the second host system to the storage device to enable exchanges between the selected host and the storage device; and
   a queue for queuing exchanges associated with a non-selected host of the first host system and the second host system while the selected host is selectively coupled to the storage device.

6. The system of claim 5 wherein the storage device communicates with the multiplexing device at a data rate different than the data rate of either or both of the first and second host systems.

7. The system of claim 6 wherein the multiplexing device is further adapted to use the queue for speed matching in exchanges between the storage device and either or both of the first and second host systems.

8. The system of claim 4 wherein the multiplexing device is further adapted to format data blocks on the storage device to include space for storage of the EEDP data protection information.

9. A method for coordinating operation of multiple host systems exchanging information with a shared SATA storage device, the method comprising:
   coupling the first host system to the storage device to enable exchanges between the first host system and the storage device;
   queuing exchanges associated with a second host system while the first host system is coupled to the storage device, wherein the step of queuing further comprises:
      entering exchanged information into a queue associated with the second host system, wherein said entering further comprises
         queuing SAS protocol commands received from the second host system; and
         queuing SATA protocol information received from the SATA storage device for return to the second host system;
      matching the speed of the communication path between the storage device and the multiplexer device with the speed of the communication path between either or both of the first or second host system and the multiplexer device by using the queue to queue exchanges between the storage device and either or both of the first and second host systems;
   decoupling the first host system from the storage device; and
   coupling the second host system to the storage device to enable exchange of queued exchanges between the second host system and the storage device.

10. The method of claim 9 wherein the steps of coupling and decoupling each further comprise:

controlling a multiplexer device to selectively couple and decouple the first host system or the second host system with the storage device.

11. The method of claim 9 further comprising:
converting between SAS protocols used in exchanges with the multiple host systems and SATA protocols used in the storage device exchanges.

12. The method of claim 11 wherein the step of converting further comprises:
emulating SCSI EEDP protocol by storing and retrieving data protection information on the storage device.

* * * * *